Oct. 22, 1929.    C. DUMBLETON    1,732,262
BAKING OVEN
Filed Aug. 4, 1926
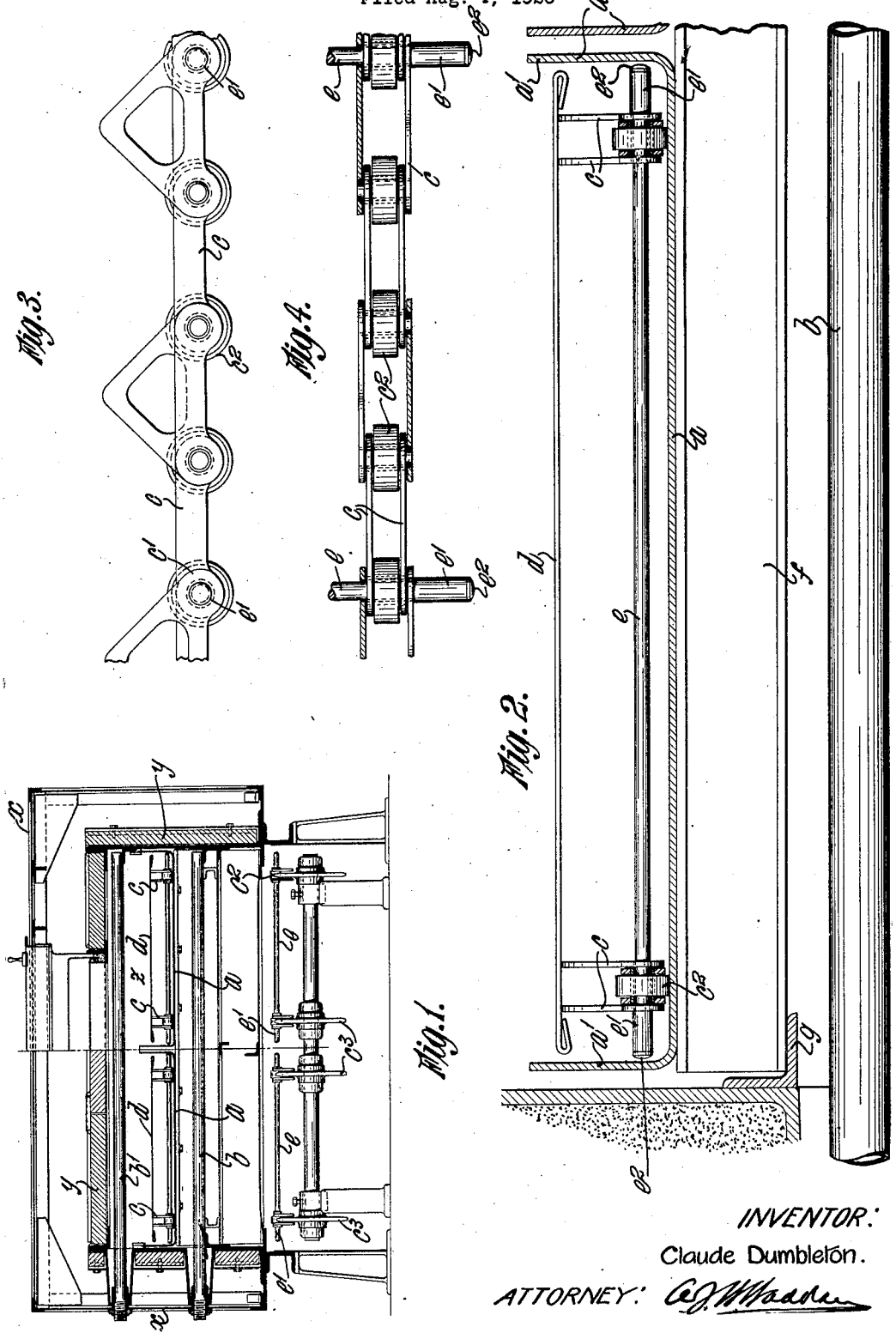
INVENTOR:
Claude Dumbleton.
ATTORNEY:

Patented Oct. 22, 1929

1,732,262

UNITED STATES PATENT OFFICE

CLAUDE DUMBLETON, OF LONDON, ENGLAND, ASSIGNOR TO BAKER PERKINS COMPANY INCORPORATED, OF NEW YORK, N. Y., A CORPORATION OF NEW YORK

BAKING OVEN

Application filed August 4, 1926, Serial No. 127,112, and in Great Britain August 19, 1925.

This invention relates to baking ovens, more particularly for the baking of bread, biscuits and the like, of that type known as "travelling" ovens, in which the goods to be baked are passed through the baking chamber on trays, pans or equivalents loosely supported on longitudinal conveyor chains.

It has been found in practice that in such type of ovens, and especially in those heated internally by gas burners located below the chains, draughts of hot gases are likely to occur which pass over the edges of the trays or pans and cause scorching of some of the goods thereon, resulting in unequal baking and tending to discolour the goods.

Also where pans are supported loosely on chains with upstanding links, known as camel-back" links, the pans are liable to twist around on said links and frequently foul one another or the sides of oven and jamb in the oven, which may cause the chains to be thrown sideways off their tracks, in which case they usually catch or twist and are broken.

Also as the oven chains become worn, it frequently happens that the links, which should stand upright, tilt over so much that the pans may fall between and twist them.

All the above objections and disadvantages are obviated by the present invention, which consists in interposing between the lower gas burners or other heating devices and the chains with the trays or pans carried thereby, baffling or shielding means which will prevent the heating gases from directly impinging on the chains or on the trays or on the goods thereon and which will at the same time serve as supports for the chains, thus dispensing with the necessity for separate rails or guides therefor as customary, and as guiding means for the pans in their passage through the oven.

A further feature of the invention consists in providing the conveyor chains with through-shafts or axles extending from links of the chain on one side to links of the chain on the other side, said through-shafts or axles acting to maintain the chain links perpendicular to said shafts and preventing them from taking an inclined position relatively to the surface of the pans carried by said links.

An embodiment of the invention is illustrated in the accompanying drawings in which Fig. 1 is a cross section through an oven provided with the improvements. Fig. 2 is a detail cross section on an enlarged scale showing one of the baffling means, and associated chains and tray. Figs. 3 and 4 are respectively a side elevation and a plan view of a portion of a chain.

In said drawings, $x$ designates the casing of the oven, $y$ the inner lining of tile or the like, and $z$ the baking chamber and $b$ $b^1$ the heating devices or gas burners below and above the trays $d$ respectively, the chains $c$ passing back below the oven and being guided by sprocket wheels $c^3$ as customary.

As shown in the drawings, the aforesaid baffle means comprise a metal plate or plates $a$ extending for the whole length of the baking chamber between the heating devices $b$ and the chains $c$, said plate preferably being of trough or similar section as shown and having upturned sides or lateral flanges $a^1$ which terminate on a level with the upper surfaces of the goods carried by the trays or pans $d$ supported on the chains and thus effectively prevent draughts of heated gases from the burners $b$ from impigning directly on the goods whilst transmitting the baking heat by radiation uniformly and effectively to the bases of the goods. The upturned sides $a^1$ of the trough also serve to guide the pans in their passage through the oven as hereinafter explained. Top heat is produced by other burners or heating devices $b^1$ above the goods as usual. The said baffle plate $a$ may be continued throughout the length of the baking chamber, or formed of a number of interconnected sections, as may be found desirable.

As aforesaid, the baffle plate $a$ supports the chain $c$, the junction $c^1$ of the links of which are usually provided with rollers or wheels $c^2$ which roll directly on the upper surface of said plate. The rollers of chains on opposite sides of the baking chamber are mounted on a through-shaft or axle $e$ which may extend laterally at each side of the rollers on the outside thereof as at $e^1$ and has rounded or shaped ends $e^2$ adapted, when desired, to ride against the inside of the upturned flanges $a^1$ of the baffle plate $a$ with sufficient clearance and a minimum of friction and thus be guided by said flanges to enable the chains to pursue a straight course through the baking chamber. The said through-shafts or axles $e$, without engaging or cooperating with the flanges of the baffle plate, also serve to keep the chains from falling over so that the camel-back links of the chains are maintained in upright position even when the chains become stretched and worn.

The baffle plate or plates $a$ may be supported at required intervals by suitable means, such as transverse I-irons $f$ carried at the sides of the baking chamber by angle-irons $g$.

What I claim as my invention and desire to secure by Letters Patent of the United States is:—

1. A baking oven of the travelling type having conveyor chains at each side carrying pans for supporting the goods in their passage through the oven, through shafts extending from links of a chain on one side to the links of a chain on the other side, and baffle means adapted to prevent gases from associated heating devices from impinging on the chains and pans; said baffle means comprising a metal plate having upturned lateral members with which the through shafts cooperate to guide the chains in a straight course through the oven.

2. A baking oven of the travelling type, comprising a pair of chains for loosely supporting carrier pans for the goods, said chains embodying upper and lower horizontal stretches extending longitudinally through the oven in a straight path; burner tubes disposed within the baking chamber of the oven between the stretches of chain; and open-topped baffle means interposed between the tubes and the upper stretches of the chains and directly supporting said upper stretches, to prevent the gases from the burners from impinging against the panned goods and the chains, said baffle means having upturned side flanges that project to a substantial extent above the level of the pans.

In witness whereof I have signed this specification.

CLAUDE DUMBLETON.